H. D. MORGAN.
CONTROL AND SHUT-OFF VALVE.
APPLICATION FILED OCT. 28, 1914.

1,168,668.

Patented Jan. 18, 1916.

WITNESSES
Chas. F. Clagett
Bertha M. Allen.

INVENTOR
Harlan D. Morgan
BY
HIS ATTORNEYS

THE COLUMBIA PLANOGRAPH CO., WASHINGTON, D. C.

UNITED STATES PATENT OFFICE.

HARLAN D. MORGAN, OF HASBROUCK HEIGHTS, NEW JERSEY, ASSIGNOR TO FLUSHO-VALVE COMPANY, OF NEW YORK, N. Y., A CORPORATION OF NEW YORK.

CONTROL AND SHUT-OFF VALVE.

1,168,668.      Specification of Letters Patent.      Patented Jan. 18, 1916.

Application filed October 28, 1914. Serial No. 868,957.

*To all whom it may concern:*

Be it known that I, HARLAN D. MORGAN, a citizen of the United States, residing at Hasbrouck Heights, in the county of Bergen and State of New Jersey, have invented an Improvement in Control and Shut-Off Valves, of which the following is a specification.

My present invention relates to a control and shut off valve, and more particularly to a valve adapted to be suitably placed either in the intake or discharge pipes, or in both of said pipes, leading to and from flush valves, commonly employed in basins, closets, and other places, where predetermined quantities of water are caused to flow at stated intervals, or at the necessity of the user.

In the use of the said devices, as is well recognized, and particularly where the flush valve is caused to operate under an excessive, and even under a high pressure, the rush of the water causes a noise which is a disadvantage and an objection to the use of such devices.

The object of my present invention is to overcome this difficulty, and to so construct a control and shut off valve as not only to regulate the quantity of water which may flow in a given period through the valve to or through the flush device, but also in which the flow of the water is so retarded as to obviate the rushing noise caused by the water, to such extent at least that the same is not noticeable.

To this end, in carrying out my invention, the control and shut off valve, made in accordance therewith, preferably comprises a casing, a plug valve associated therewith, suitable means within the plug valve for retarding the flow of the water therethrough, and devices for regulating and controlling the compactness of the aforesaid means so that the retardation of the water, under any pressure, may be controlled; and the construction is such that the valve may be turned to shut off the water, and means for controlling the flow of the water exchanged, repaired or regulated without disconnecting the valve from the service pipes, as will be hereinafter more particularly described.

Figure 1:
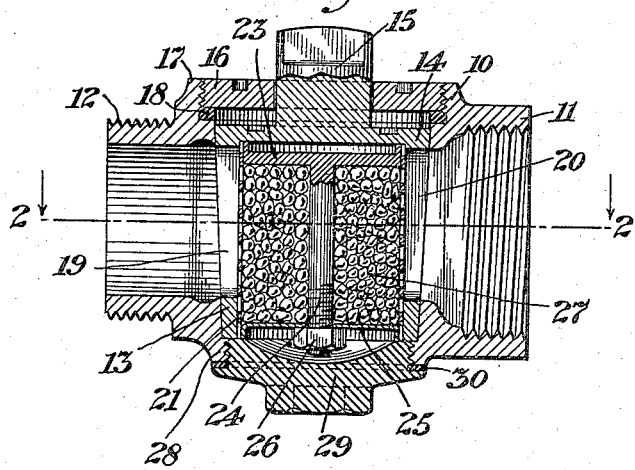
Figure 2:
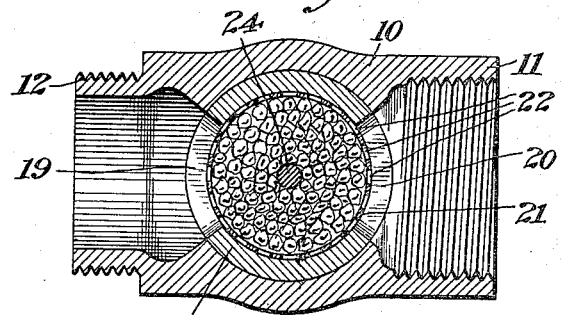
Figure 3:
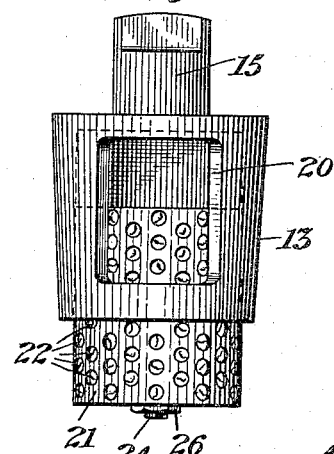

In the drawing, Figure 1 is a central longitudinal cross section of a control and shut off valve made in accordance with my invention. Fig. 2 is a similar section taken on the line 2, 2, Fig. 1, and Fig. 3 is an elevation of the valve member showing the perforated shell containing the granular substance employed to retard the water as only partially inserted therein.

Referring to the drawing, 10 indicates the body or casing of the control and shut off valve. This casing is adapted to be placed in the service pipe leading to or from a flush valve, or other similar apparatus, and as illustrated, is provided at one side with a connection 11, adapted to receive a coupling, and at the opposite side with a connection 12, adapted to receive a nipple. It will be understood, however, that the connections 11 and 12 may be otherwise constructed, and that either one may be the inlet and the other the outlet to and from the control and shut off valve.

The casing 10 is provided with a suitable socket adapted to receive a hollow plug valve 13. At one end, this valve has a head 14, fitted with a valve stem 15, which, when in place, extends, preferably centrally, through an aperture provided therefor in a cover member 16, turned down within a rim 17 surrounding the opening through which the plug valve is inserted. The cover 16, as indicated, is preferably turned down against a gasket 18 to make a tight joint between the parts to prevent the leaking of the valve.

In oppositely disposed positions in the walls of the plug valve, the same is provided with ports 19 and 20, adapted, upon turning the valve by means of the stem 15, to open the ports to any extent to and from the inlet and outlet connections, and to entirely close the valve to prevent the flow of liquid through the same.

The opposite end of the plug valve is open and adapted to receive a perforated shell member 21, which fits closely therein, the apertures in the walls of this shell member being indicated at 22. At the inner end of the perforated shell 21, the same is fitted with a head 23, fixed in position therein. Secured to this head, and extending longitudinally through the perforated shell, is a stem 24.

At its opposite or outer end, the perforated shell is also provided with a head 25, which is adjustable to position therein. As illustrated, the head 25 has secured thereto a nut 26, adapted, with the head, to be turned down on the screw threaded end of the stem 24, in order to regulate and control the compactness of the granular material 27 employed within the perforated shell to retard the flow of the water through the valve, in order to overcome the rushing noise, otherwise caused by the passage of the water under pressure through the valve, the adjustment of the head 25, to regulate the compactness of the granular material, being, obviously, to also regulate and control the speed at which the water will pass through the valve.

On the side of the casing opposite the opening through which the plug valve is inserted, there is also an opening surrounded by a rim 28 into which a plug 29 is adapted to be turned down against a gasket 30 to make a tight joint at this side of the valve, and also to maintain the plug valve and the perforated shell in their proper positions.

From the foregoing description, it will be apparent that the granular material within the perforated shell will retard the flow of the water through the valve to an extent sufficient to obviate the rushing noise which would otherwise be caused thereby, and that the compactness of the granular material may be determined by the position of the adjustable head 25 to control the speed at which the water will flow.

Attention is also directed to the fact that this control and shut off valve is self-cleansing, inasmuch as the dirt and sediment will collect within the confines of the port at the inlet side of the valve, and that by turning the valve completely around, the dirt and sediment so collected will be washed away.

Attention is also directed to the fact that the plug valve may be turned to shut off the water, and the plug 29 removed to renew the granular material or adjust the compactness thereof without disconnecting the valve from the service pipes in which it is placed.

I claim as my invention:

1. A control and shut off valve comprising a casing, a tapered plug valve with ports in opposite sides thereof within said casing, a perforated cylindrical shell fitting within the said plug valve, a head fixed in the end of the said cylindrical shell adjacent the larger end of the said plug valve, an adjustable head in the opposite end of the said cylindrical shell, a granular material within the said cylindrical shell, means for determining the position of the said adjustable head in the end of the said cylindrical shell to determine the density of the granular material therein, devices associated with the casing at the larger end of the said plug valve for maintaining the same in position therein, and a cap removably connected to the said casing at the smaller end of the said plug valve to gain access to the said adjustable head and said means for determining the position of the same.

2. A control and shut off valve comprising a casing, a tapered plug valve with ports therein fitted in a socket provided therefor in the said casing, a stem extending from the larger end of the said tapered plug valve by which the same is turned, a ring surrounding the said stem and removably connected to the said casing and maintaining the said plug valve in position in the socket therein, a perforated cylindrical shell fitted within the said plug valve, a head fixed in the end of the said cylindrical shell adjacent the larger end of the said plug valve, a movable head in the opposite end of the said cylindrical shell, a rod secured in the fixed head and extending through an aperture provided therefor in the said movable head, a granular material filling the said cylindrical shell, means adjustable to position on the said rod for determining the position of the said movable head, and a cap removably connected to the casing at the smaller end of the said plug valve in order to gain access to the said movable head and said means on the said rod for adjusting the same to position.

3. A control and shut off valve comprising a casing having a socket therein, a hollow plug valve having oppositely disposed ports in the walls thereof, and adapted to fit and turn within the socket in the casing, a perforated shell fitting within the said hollow plug valve, a head secured within the shell at one end thereof, a granular material filling the said shell, and a head adjustable within the shell at the opposite end thereof for regulating the compactness of the said granular material therein.

4. A control and shut off valve comprising a casing having inlet and outlet connections and a socket with openings at the opposite sides of the said casing, a hollow plug valve having oppositely disposed ports in the walls thereof and adapted to fit and turn within the said socket, a cover closing one of the openings in the said casing, a stem connected to the hollow plug valve and extending through the said cover, a perforated shell fitting within the said hollow plug valve, a head secured within the inner end thereof, a granular material filling the said perforated shell, a head adjustable within the said shell at the opposite end thereof and adapted to regulate the compactness of the said granular material, and a plug fitting within the opening at the opposite side of this casing and adapted to maintain the said plug valve and perforated shell in their relative positions therein.

Signed by me this 22nd day of October, 1914.

HARLAN D. MORGAN.

Witnesses:
BERTHA M. ALLEN,
J. B. LE BLANC.